Nov. 23, 1954

R. G. LE TOURNEAU 2,695,041

MOBILE TREE SAW

Filed Oct. 6, 1950

INVENTOR.
R. G. LeTourneau
BY
F. D. Copeland Jr.
AGENT

Nov. 23, 1954  R. G. LE TOURNEAU  2,695,041
MOBILE TREE SAW
Filed Oct. 6, 1950  3 Sheets-Sheet 3

INVENTOR.
R. G. LeTOURNEAU
BY F. D. Copeland Jr.
AGENT

United States Patent Office 2,695,041
Patented Nov. 23, 1954

2,695,041

MOBILE TREE SAW

Robert G. Le Tourneau, Longview, Tex., assignor to R. G. Le Tourneau, Inc., Peoria, Ill., a corporation of California Application October 6, 1950, Serial No. 188,761

11 Claims. (Cl. 143—43)

This invention relates generally to mobile tree saws, and more particularly to a novel heavy duty, self-propelled tree saw.

The primary object of this invention is to provide a wheel saw wherein the longitudinal traveling rotating saw blade is raised and lowered by means of a parallelogram linkage to insure that the blade will always be parallel to its line of travel and thereby eliminate binding on the blade due to misalignment.

Another object is to provide an all electric tractor propelled tree saw in which all of the operations of the saw and motivation and steering of the tractor are accomplished by electrical means.

A further object is to provide a novel lateral swinging structure for making side cuts or positioning the saw blade without moving the tractor.

Yet another object is to provide a tractor mounted tree saw wherein the engine is at the rear of the tractor to counterbalance the extended saw unit.

A still further object is to provide a tractor mounted tree saw wherein the frame which is necessary to support the lateral pivoting group also acts as a protective frame for the operator's cab to prevent danger thereto from falling trees.

These and other objects will be apparent from the following specification and drawings wherein:

Figure 5 represents a fragmentary section of the roller structure showing the relationship of the horizontal and vertical axis rollers and the sliding beam.

Figure 1:
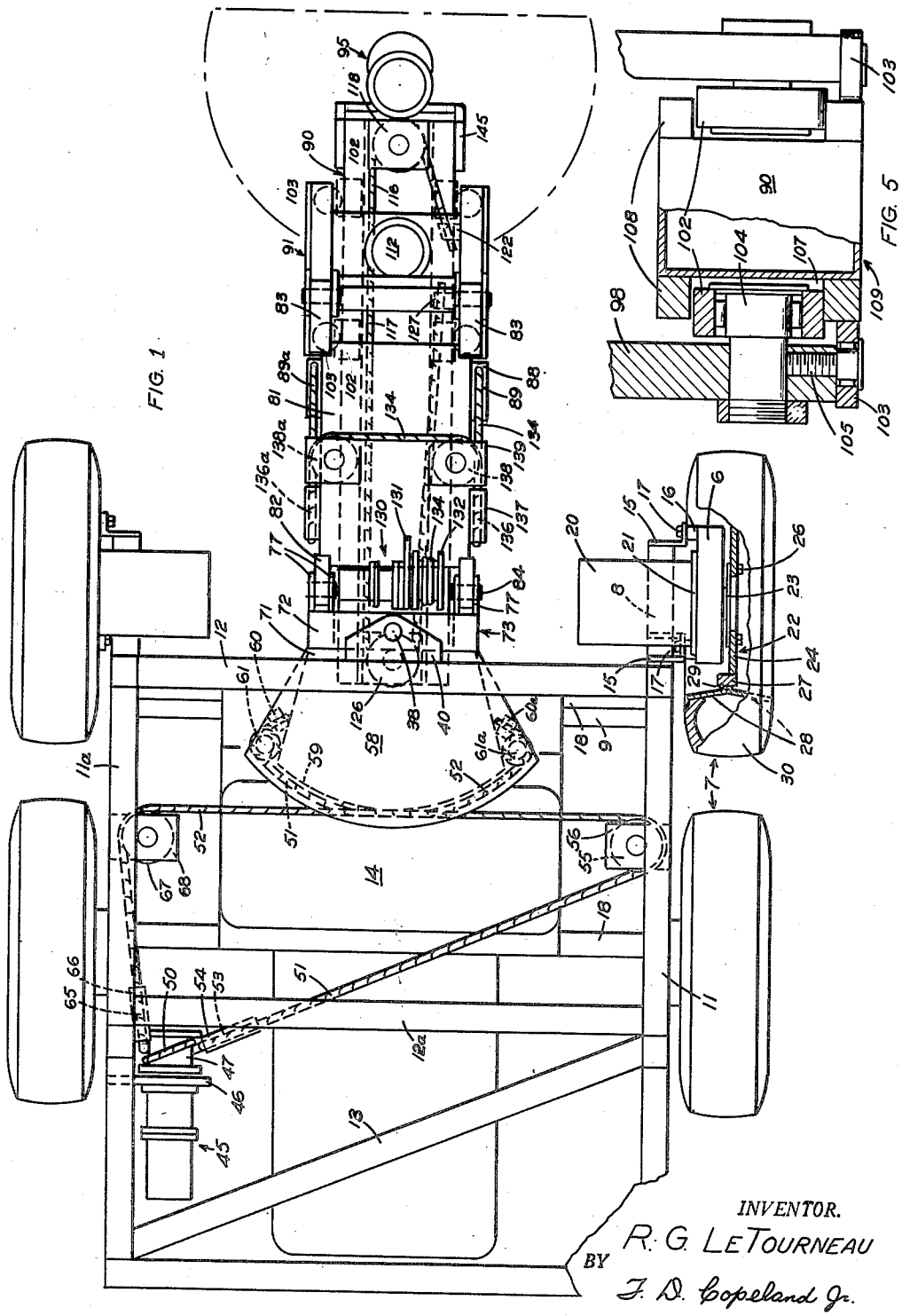
Figure 1 represents a top plan view of the self-propelled tree saw of this invention.
Figure 2:
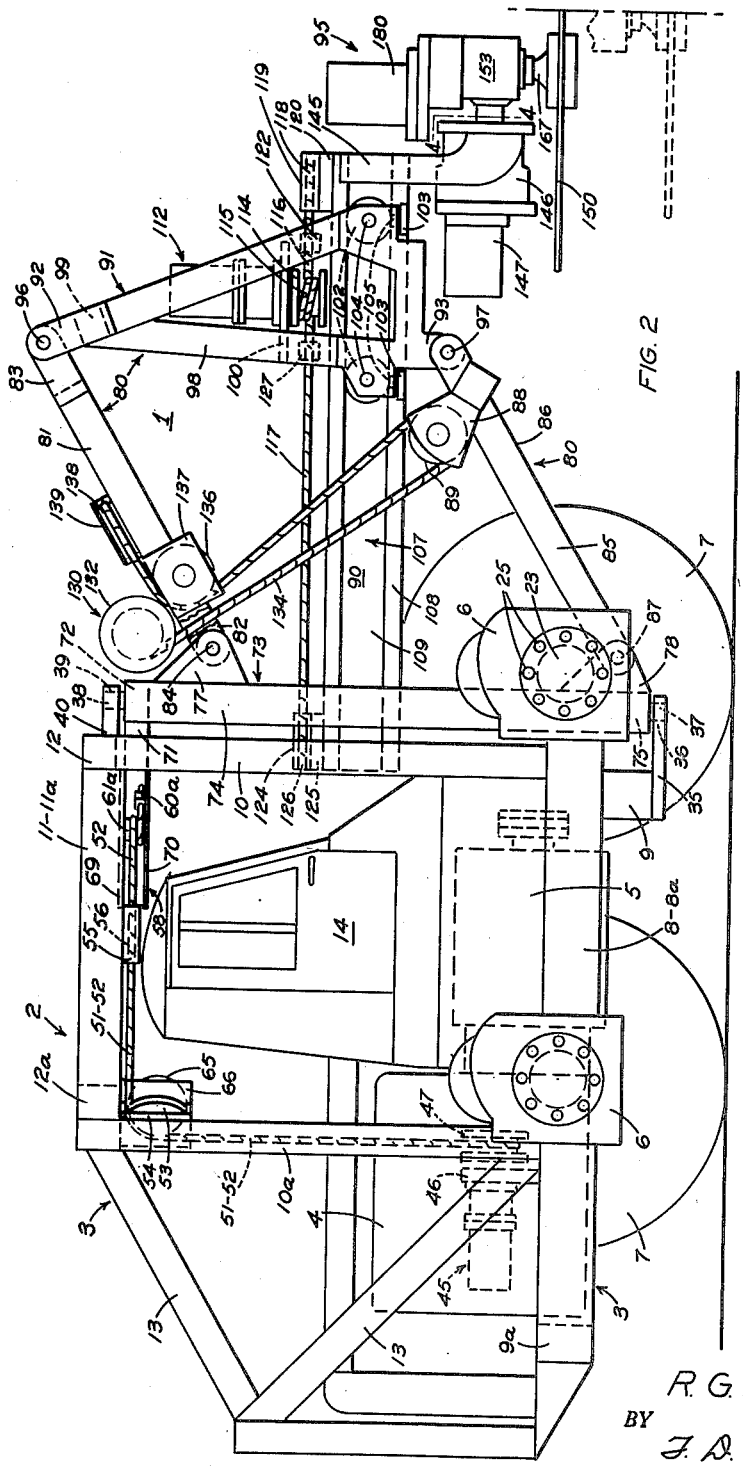
Figure 2 represents a side elevational view of the tree saw of Figure 1 with the wheels on one side removed and a portion of the top link platform removed for clarity of illustration.

Referring now more particularly to the drawings, the saw group indicated generally at 1 is pivotally supported by and from a tractor group 2. Tractor group 2 includes a frame 3 which supports an internal combustion engine 4, a directly driven generator 5 and electric wheel driver units 6, which latter units are supported from the ground by vehicle wheels 7 which they drive.

Frame 3 is generally box-shaped as a whole, including longitudinal floor beams 8, 8a, floor cross members 9, 9a, vertical posts 10, 10a, top longitudinal beams 11, 11a, top cross members 12, 12a, and various diagonal braces 13. Various other internal frame members such as 18 may be included where needed to provide support for the engine 4, generator 5, cab 14, etc. Beams 8, 8a, include vertical brackets 15 to align with mounting pads 16 of wheel driver units 6 to permit the wheel driver units 6 to be rigidly but removably attached thereto by means of cap-screws 17. Drivers 6 are in reality a reduction gear case to which electric motors 20 may be attached by way of motor flange 21 whereby the motor may operate the gear train contained within the driver and the reduced speed output is delivered to the wheel 22 by way of flanged wheel spindle 23. Wheel 22 is of the same general type as shown in my Patent 2,466,449, granted April 15, 1949, entitled Tire and Rim Assembly and consists briefly of a center disk 24 attached to the bolt circle 25 of spindle 23 by means of capscrews 26; a heavy duty ring 27 is attached to the outer circumference of disk 24 and to the inner circumference of rims 28, one of which is removably secured to ring 27 by a locking band 29 to permit removal of one rim 28 when changing tire 30.

Steering of this tractor group is accomplished by application of power to motors 20 on only one side of the vehicle at a time.

Floor cross member 9 is situated below the horizontal plane of braces 8 and 8a, and includes a forwardly projecting pivot plate 35 which includes a hole 36 in which lower pin 37 of saw group 1 is pivoted. Upper pin 38 is pivoted in hole 39 of top bracket 40 welded directly to top cross member 12 of the frame 3. The entire saw group 1 is adapted to be power turned through pins 37 and 38 by the following arrangement:

Electric winch 45 is bolted to plate 46 of beam 8a which plate provides the entire support for the winch. A cable drum 47 included as a power driven member of winch 45 includes a cable 50 thereon, which cable includes oppositely wound leads 51 and 52 extending from the drum. Lead 51 extends upward from drum 47 over sheave 53 of sheave housing 54 suspended from cross member 12a and from there outward and around sheave 55 of sheave housing 56 attached to the underside of beam 11 and thence to sector member 58 where it follows the curvature 59 and is terminated at cable anchor 60 after having been wrapped around post 61 to take the strain off anchor 60. Lead 52 is reeved in a similar manner: up and over sheave 65 of housing 66 under cross member 12a and beam 11a and thence to and around sheave 67 of housing 68 under beam 11a and then to sector 58 where after following curvature 59 and wrapping about post 61a it is anchored at 60a. Sector 58 includes top and bottom plates 69 and 70 which provide support for posts 61 and 61a and anchors 60 and 60a. The forward end 71 of sector 58 is welded to top piece 72 of pivot structure 73 of saw group 1. Vertical side members 74 support top piece 72 and a similar bottom piece 75 which pieces support pins 38 and 37 respectively whereby the entire saw group is pivoted laterally. It will now be observed that as winch 45 is rotated in one direction, lead 51 of cable 50 will be reeled in and in so moving will exert a pull on post 61 of sector 58. Sector 58 being free to turn by virtue of pins 37 and 38 will so turn in the direction it is being pulled, and since it is welded to pivot structure 73 it will cause this structure as well as the entire group 1 to turn with it. Since cable lead 52 is oppositely wound on drum 47 it will pay out at this particular time, so that its presence in the cable system will offer no resistance to the turning movement. When the direction of winch 45 is reversed the action of leads 51 and 52 will likewise reverse and the entire saw group 1 will turn to the (vehicle) right.

In addition to pivot structure 73, which includes forwardly projecting pivot brackets 77 and 78 near the top and bottom respectively of side members 74, the saw group 1 includes a parallelogram frame 80 which is employed to vertically position sliding beam 90 which supports saw unit 95. Frame 80 includes a top platform 81 with a pair of rearwardly extending pivot ears 82 at one end and a pair of forwardly extending pivot ears 83 at the other end thereof; ears 82 are attached between pairs of brackets 77 by pivot pins 84. A bottom platform 85 of similar construction to top platform 81 and includes side plates 86 which are connected at one end to brackets 78 by pin 87. Sheave housings 88 including sheaves 89 are rigidly attached to the outside of plate 86. A roller support structure 91 including top ears 92 and bottom ears 93 is pin connected to ears 83 and plates 86 respectively by means of pins 96 and 97. Structure 91 includes triangular side frames 98 at each side thereof which frames surround sliding beam 90 at installation, and are spaced apart by transverse members including top strut 99 and motor mounting plate 100. Each longitudinal end of side frames 98 includes a horizontal axis roller 102 and a vertical axis roller 103 turning in frames 98 on their axes 104 and 105 respectively. Rollers 102 operate on the inner surfaces of a track 107 formed by welding bars 108 at the top and bottom of the lateral sides of box beam 109 which forms the main body of sliding beam 90. Rollers 103 operate on the outer surfaces of bars 108. Electric winch 112, attached to mounting plate 100, includes a cable drum 114 on which a cable 115 is wound. Oppositely wound leads 116 and 117 extend forward and rearward from drum 114 to which it is anchored. Lead 116 encircles sheave 118 in sheave housing 119 which is supported from beam 109 by spacer 120, and returns rearward to an anchor 122 on side frame 98 of roller support structure 91. Lead 117 is directed rearward to sheave housing 124 supported from beam 109 by spacer 125 where it encircles sheave 126 and is then directed forward to its anchor 127 also on side frame 98. It will be observed that rotation of drum 114 in one direction will exert a pull on cable lead 117 throughout its length and on anchor 127, and will move structure 91 rearward on rollers 102; whereas rotation of the drum in the opposite direction will place tension on lead 116 and a pull on anchor 122 to cause structure 91 to roll forward.

The top platform 81 includes an electric winch 130 supported therefrom on mounting plate 131. Drum 132 of winch 130 includes a single cable 134 anchored thereon which extends down and about sheave 89 and thence upward and around sheave 136 of housing 137 mounted on one outer side of platform 81. Cable 134 is next directed around sheave 138 of housing 139 mounted flush with the top side of platform 81; from sheave 138 cable 134 is directed to and reeved through sheaves 138a, 136a and 89a on the left side of the platform which sheaves correspond to the basic numbered sheaves on the right side of the platform, and then said cable is dead-ended in a suitable anchor (not shown) on platform 81. This reeving produces a balanced cable system for exerting an even pull on platform 85 for raising same under the action of winch 130. Observing parallelogram frame 80 strictly as a geometric figure, we observe that platforms 81 and 85 comprise two movable parallel sides of the parallelogram. Roller support structure 91 comprises the other movable side whereas pivot structure 73 is a vertical and stationary side. Cable 134 is approximately coincident with the diagonal of the parallelogram formed by these four sides. When the diagonal of a parallelogram is shortened, the sides must move, and since 73 is stationary, the other sides must move about the stationary member. And since side 73 is vertical, its parallel side 91 must consequently remain vertical while moving in a vertical plane.

Figure 3:
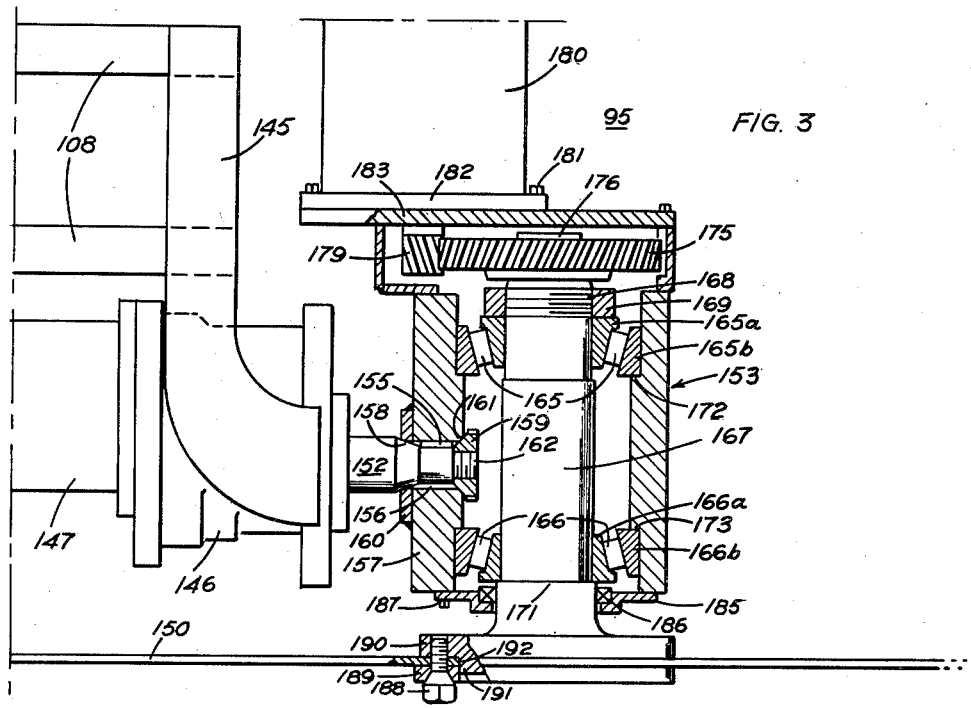
Figure 3 is an enlarged side elevation of the saw unit with a fragmentary section taken through the main case.
Figure 4:
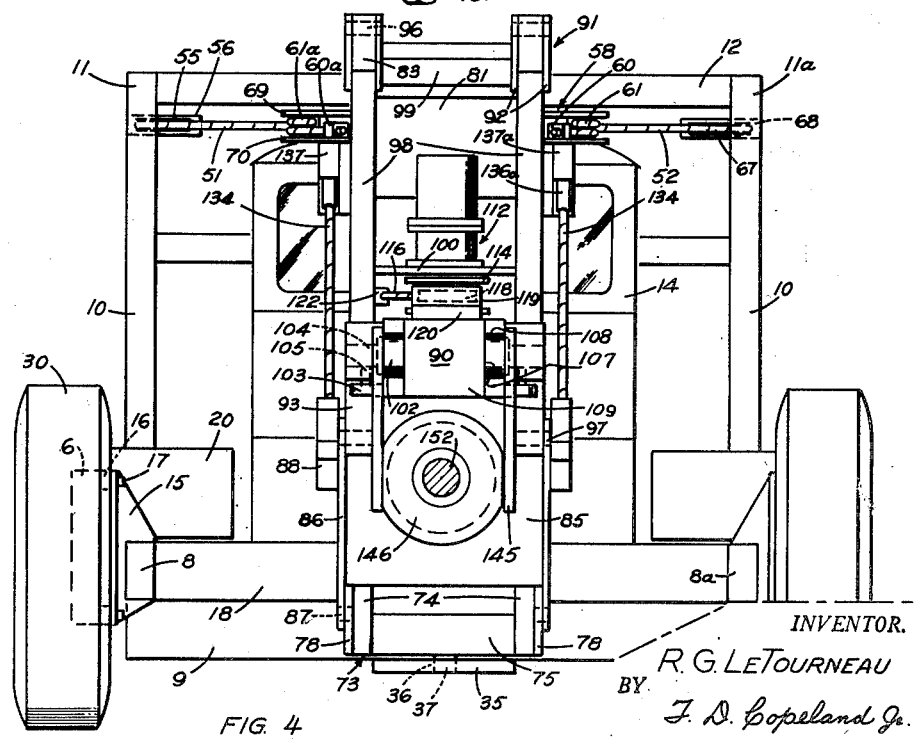
Figure 4 is a front view of the saw shown in Figure 2 with a portion of the saw unit removed along lines 4—4 for clarity of illustrating.

Sliding beam 90 includes at its forward end a pair of brackets 145 which are welded to the outer side of bars 108 and depend therefrom. Brackets 145 are attached to the sides of gear box 146 of electric motor 147 which is adapted to impart tilting movement to saw 150 by the following arrangement shown in Figure 3:

Gear box 146 including internal reduction gears (not shown) is connected in driven relation to motor 147, and this motor through the gear box ultimately imparts a power drive to output shaft 152 of the gear box which projects therefrom and is connected to case 153 to turn the latter at a greatly reduced speed. Splines 155 of output shaft 152 matchingly engage internal splines 156 of rear wall 157 of case 153, and the shaft and wall have a matching taper 158 at one side of the engagement and wall 157 and nut 159 have a matching taper 161 at the other side of the engagement. Taper 158 extends through boss 160 welded to wall 157 and surrounding shaft 152. Nut 159 engages threads 162 of shaft 152 so that tightening nut 159 causes tapers 161 and 158 to be firm and provides a rigid connection between shaft 152 and case 153. Case 153 supports spaced bearing 165 and 166 in which drive spindle 167 is journalled. Theads 168 near the upper end of spindle 167 are engaged by lock nut 169 which abuts against inner race 165a of bearing 165 so that the nut, spindle and inner race turn in unison, and shoulder 171 of spindle 167 abuts inner race 166a of bearing 166 so that tightening nut 169 will take up any slack in the bearings 165 and 166. Outer races 165b and 166b are shouldered at 172 and 173 within case 153. At its upper end spindle 167 engages gear 175 by means of spline connection 176 which is of the same construction as that including splines 155 and 156. Gear 175 is in mesh with and is driven by pinion shaft 179 which is driven by electric motor 180 and extends therefrom into case 153. Motor 180 is attached to the case by capscrews 181 extending through motor flange 182 into the top wall 183 of case 153. At the lower end of case 153, bearing cap 185, including seal 186, is attached thereto by capscrews 187. Circular saw 150 is removably attached to the bottom of spindle 167 by way of tapered capscrews 188 which engage clamp ring 189 and spindle flange 190 so as to bind saw 150 therebetween at a position immovable radially due to the presence of shoulder 191 of flange 190 which snugly fits the inner diameter 192 of saw 150.

It will be observed that both the engine 4 and the operator's cab 14 are well protected from falling timbers by a framework including frames 11, 11a, 12, 12a, etc. and this framework is integral with bottom beams 8, 8a, 9, etc. which acts as the vehicle frame. This now completed framework also supports the saw group 1 in pivoted relationship thru pivot plates 35 and 40 and pins 37 and 38. A useful weight distribution results from this arrangement in that the relatively heavy engine 4 is at one end of the framework and the movable saw is at the other end of the complete machine. Altho the saw unit is relatively light it has a long lever arm in beam 90 and when extended and engaging a tree, some such counterbalance as engine 4 is necessary to maintain stability in this electric tree saw.

From the foregoing description it will be readily seen that there has been produced such a device as substantially fulfills the objects of the invention as set forth herein.

While this specification sets forth in detail the present and preferred construction of this invention, still in practice such deviations from such detail may be resorted to as do not form a departure from the spirit of the invention, as defined in the appended claims.

Having thus described this invention, what is claimed as new and useful and is desired to be secured by Letters Patent is:

1. A mobile tree saw comprising: a tractor group supported and propelled by vehicle wheels, a frame on the tractor group; a saw group ahead of the tractor group; a power saw in said saw group, a pivot structure including a sector member pivoted to said frame about a vertical axis, a curvature on said sector member; a power winch including oppositely wound cable leads mounted in said tractor group, sheaves on said tractor frame at opposite sides thereof, one cable lead reeved thru the sheaves on one side of the frame and approaching the sector member tangentially with respect to said curvature, said one lead following the curvature in one direction to an anchor at the distal side of the curvature; said other cable lead reeved thru the sheaves on the other side of the frame and approaching the sector member tangentially with respect to said curvature, said other lead following the curvature in the opposite direction to said one lead to an anchor at the distal side of the curvature with respect to its direction of travel; said power winch operable to pay out one cable lead while reeling in the other cable lead to impart lateral turning movement to said entire saw group about said vertical axis.

2. A mobile tree saw comprising: a tractor group supported and propelled by vehicle wheels, a saw group ahead of the tractor group and supported therefrom, a saw unit in said saw group; a parallelogram frame in said saw group for vertically adjusting said saw unit comprising: a top platform and a bottom platform parallel thereto, a vertical member attached to said tractor group in a vertically immovable relation, a fourth structure parallel to said vertical member associated with said saw unit, all four mentioned members being pivotally connected, a power winch mounted on said top platform, and a cable from said winch operatively connected between said top and bottom platforms whereby operation of said winch causes said platforms to change their angular position and thereby move said fourth structure and associated saw unit in a vertical direction; said fourth structure comprising a roller support structure including spaced triangular side frames, rollers journalled in said side frames at horizontally spaced points, a horizontal beam positioned between said side frames, a track at each lateral side of said beam, said rollers cooperating with said track, a saw unit supported at the forward end of said beam, and power means between said roller support structure and said beam to move said beam longitudinally thru said roller structure and thereby position said saw unit ahead of the tractor group at selected locations.

3. A mobile tree saw as in claim 2 wherein said power means comprises: an electric winch supported on said roller support structure, sheaves at the front and rear end of said sliding beam, a cable including forward and rearward extending leads oppositely wound on said winch, said forward extending lead encircling said front end sheave and returning to anchor on said roller support structure, said rearward extending lead encircling said rear end sheave and returning to anchor on said roller support structure, said electric winch operable through this cable reeving to selectively move said beam in a forward or rearward direction.

4. A roller support structure for a saw group comprising; spaced triangular side frames terminating at the top, a horizontal base at the bottom of said side frame, a transverse strut connected between said frames at the top, pivot ears projecting upward from said top, longitudinally spaced rollers journalled in said side frame near the base, pivot ears depending from the base of said side frames, a mounting plate parallel to said strut connecting the inner sides of said side frames at a point between said strut and base, and a power winch on said mounting plate, a cable drum on said winch extending below said plate, said drum and said side frames defining an outline of sufficient size and shape to permit a saw supporting beam including side tracks to move longitudinally thru said outline and in cooperation with said rollers.

5. In a mobile saw adapted for cutting trees and limbs the combination of: a tractor; a saw group structure pivotally mounted on the tractor about an axis vertical with respect to said tractor; a beam slidably mounted on the structure for movement in a horizontal plane toward and away from said structure; said beam being arranged in a plane parallel to the longitudinal axis of said tractor at all times; a power saw assembly associated with the beam; power means for imparting sliding motion to the beam; raising and lowering means for the beam; and power means including a cable rotated sector member for imparting angular horizontal motion to the saw group.

6. A device as set forth in claim 5, said sector member being fixed on the structure and a pair of power transmitting cables fixed on the sector member for moving it in opposite directions.

7. A mobile tree saw comprising: a tractor; a saw group pivotally supported from the tractor about an axis vertical with respect thereto; a sector member having power means associated therewith for imparting movement to the saw group about said axis; the saw group comprising a parallelogram structure arranged in a vertical plane one member of which is pivoted on the tractor and each member of which is pivotally connected to its adjacent members; a beam slidably mounted on that parallelogram member distant from the member pivoted on the tractor for movement in a horizontal plane toward and away from said member pivoted on the tractor; a mounting assembly for a power saw group fixed to the beam; and additional power means for changing the shape of the parallelogram whereby the beam and mounting assembly are raised and lowered while remaining at all times in a plane at right angles to said vertical axis.

8. A device as set forth in claim 7, in which both mentioned power means are winch operated cable systems, and having an additional winch and cable system associated with said beam for imparting sliding motion thereto.

9. A device as set forth in claim 7, said mounting assembly comprising brackets depending from the beam at the forward end thereof, a saw housing pivotally mounted on said brackets for rotation about a horizontally extending axis and having a power saw mounted therein, and power means for imparting angular movement to said saw housing.

10. In a mobile saw adapted for cutting trees and limbs, the combination of: a tractor; a saw group structure pivotally mounted on the tractor about an axis vertical with respect to said tractor; a beam slidably mounted on the structure for movement in a horizontal plane toward and away from said structure; a power saw assembly associated with the beam; power means for imparting sliding motion to the beam; and raising and lowering means for the beam, said saw group structure comprising a plurality of members pivotally connected to form a parallelogram and arranged in a vertical plane, one of the members being pivotally mounted on the tractor, said beam being slidably mounted on that member not connected to said one member.

11. A device as set forth in claim 10, said power saw assembly comprising brackets depending from the beam at the forward end thereof, a saw housing pivotally mounted on said brackets for rotation about a horizontally extending axis and having a power saw mounted therein, and power means for imparting angular movement to said saw housing.

References Cited in the file of this patent

UNITED STATES PATENTS

| Number | Name | Date |
|---|---|---|
| 432,444 | Segur | July 15, 1890 |
| 763,161 | Crum | June 21, 1904 |
| 1,602,357 | Georgelis | Oct. 5, 1926 |
| 1,622,704 | Coil | Mar. 29, 1927 |
| 2,075,954 | Osgood | Apr. 6, 1937 |
| 2,404,655 | Randall | July 23, 1946 |
| 2,462,314 | Fuqua | Feb. 22, 1949 |
| 2,538,371 | Le Tourneau | Jan. 16, 1951 |
| 2,603,249 | Lawrence | July 15, 1952 |

FOREIGN PATENTS

| Number | Country | Date |
|---|---|---|
| 1,474 | Great Britain | May 29, 1865 |